United States Patent
O'Connor et al.

(10) Patent No.: US 10,678,993 B1
(45) Date of Patent: *Jun. 9, 2020

(54) SYSTEM FOR CREATING MANAGING AND DISPLAYING MULTI-FRAME BASED ADS ON MOBILE DEVICES

(71) Applicant: Google LLC, Mountain View, MA (US)

(72) Inventors: Timothy Wong O'Connor, Mountain View, CA (US); Craig Lawrence Warner, Richardson, TX (US); Fei Qi, Mountain View, CA (US); Abby Weaver Johns, Mountain View, CA (US); John Sung Joon Park, Mountain View, CA (US); Job Lawrence, Mountain View, CA (US)

(73) Assignee: Google LLC, Mountain View, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/005,392

(22) Filed: Jun. 11, 2018

Related U.S. Application Data

(63) Continuation of application No. 14/042,330, filed on Sep. 30, 2013, now Pat. No. 9,996,509.

(51) Int. Cl.
| | |
|---|---|
| *G06F 40/14* | (2020.01) |
| *G06F 17/00* | (2019.01) |
| *G06F 16/958* | (2019.01) |
| *G06F 16/9535* | (2019.01) |

(52) U.S. Cl.
CPC .......... *G06F 40/14* (2020.01); *G06F 16/9535* (2019.01); *G06F 16/972* (2019.01); *G06F 17/00* (2013.01)

(58) Field of Classification Search
CPC ............ G06F 17/2247; G06Q 30/0255; G06Q 30/0257; G06Q 30/0267; G06Q 30/0271; G06Q 30/0269; G06Q 30/0241
See application file for complete search history.

(56) References Cited

U.S. PATENT DOCUMENTS

| | | | |
|---|---|---|---|
| 9,104,669 B1* | 8/2015 | Des Jardins ............ | G06F 16/40 |
| 2002/0019763 A1* | 2/2002 | Linden .................... | G06Q 30/02 |
| | | | 705/14.53 |
| 2005/0065856 A1* | 3/2005 | Roberts ................ | G06Q 10/087 |
| | | | 705/27.1 |
| 2007/0239535 A1* | 10/2007 | Koran .................... | G06Q 30/02 |
| | | | 705/14.25 |

(Continued)

*Primary Examiner* — Howard Cortes
(74) *Attorney, Agent, or Firm* — Foley & Lardner LLP

(57) ABSTRACT

A method includes, but is not limited to any combination of: determining a plurality of third-party content elements based in part on information associated with a request for third-party content. The request for third-party content may be received from a web browser displaying a first webpage to a user. A first element from the plurality of determined third-party content elements is transmitted to the web browser. Upon receiving from the web browser a second request for third-party content including user interaction data with the first element, data associated with the determined plurality of third-party content elements is updated based at least in part on the user interaction data. A second third-party element from the plurality of updated third-party content elements is transmitted to the web browser.

20 Claims, 7 Drawing Sheets

(56) References Cited

U.S. PATENT DOCUMENTS

| | | | |
|---|---|---|---|
| 2008/0040341 A1* | 2/2008 | York | G06Q 30/02 |
| 2008/0183573 A1* | 7/2008 | Muschetto | G06Q 30/02 |
| | | | 705/14.41 |
| 2011/0173570 A1* | 7/2011 | Moromisato | G06F 16/904 |
| | | | 715/838 |
| 2011/0196749 A1* | 8/2011 | Herlein | G01N 33/2888 |
| | | | 705/14.72 |
| 2011/0231265 A1* | 9/2011 | Brown | G06Q 30/02 |
| | | | 705/14.73 |
| 2012/0047016 A1* | 2/2012 | Yu | G06O 30/02 |
| | | | 705/14.54 |
| 2012/0089466 A1* | 4/2012 | Froloff | H04W 4/21 |
| | | | 705/14.71 |

* cited by examiner

U S 10,678,993 B1

SYSTEM FOR CREATING MANAGING AND DISPLAYING MULTI-FRAME BASED ADS ON MOBILE DEVICES

CROSS-REFERENCE TO RELATED APPLICATIONS

This application claims the benefit of and priority to U.S. application Ser. No. 14/042,330, filed Sep. 30, 2013, the content of which is incorporated herein in its entirety.

BACKGROUND

The present disclosure relates generally to online content presented on websites to users of computing devices. More specifically, the present disclosure relates to presenting online content to users of mobile devices. Increasingly web growth comes from casual users who are looking for quick information bites on their mobile devices and tablets. These users are often disengaged and distracted. Serving third-party content to these users often results in third-party content providers overpaying for clicks received from this type of content.

SUMMARY

A method includes, but is not limited to any combination of: receiving a request for third-party content from a web browser displaying a first webpage to a user; determining a plurality of third-party content elements based in part on information associated with the request; transmitting a first element from the plurality of determined third-party content elements to the web browser; receiving from the web browser a second request for third-party content including user interaction data with the first element; updating data associated with the determined plurality of third-party content elements based at least in part on the user interaction data; and transmitting a second third-party element from the plurality of updated third-party content elements to the web browser.

A computer-readable storage medium having machine instructions stored therein, the instructions being executable by a processor to cause the processor to perform operations comprising: receiving a request for third-party content from a web browser displaying a first webpage to a user; determining a plurality of third-party content elements based in part on information associated with the request; transmitting a first element from the plurality of determined third-party content elements to the web browser; receiving from the web browser a second request for third-party content including user interaction data with the first element; updating data associated with the determined plurality of third-party content elements based at least in part on the user interaction data; and transmitting a second element from the plurality of updated third-party content elements to the web browser.

A system including: one or more data processors; and one or more storage devices storing instructions that, when executed by the one or more data processors, cause the one or more data processors to perform operations comprising: receiving a request for third-party content from a web browser displaying a first webpage to a user; determining a plurality of third-party content elements based in part on information associated with the request; transmitting a first element from the plurality of determined third-party content elements to the web browser; receiving from the web browser a second request for third-party content including user interaction data with the first element; updating data associated with the determined plurality of third-party content elements based at least in part on the user interaction data; and transmitting a second element from the plurality of updated third-party content elements to the web browser.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
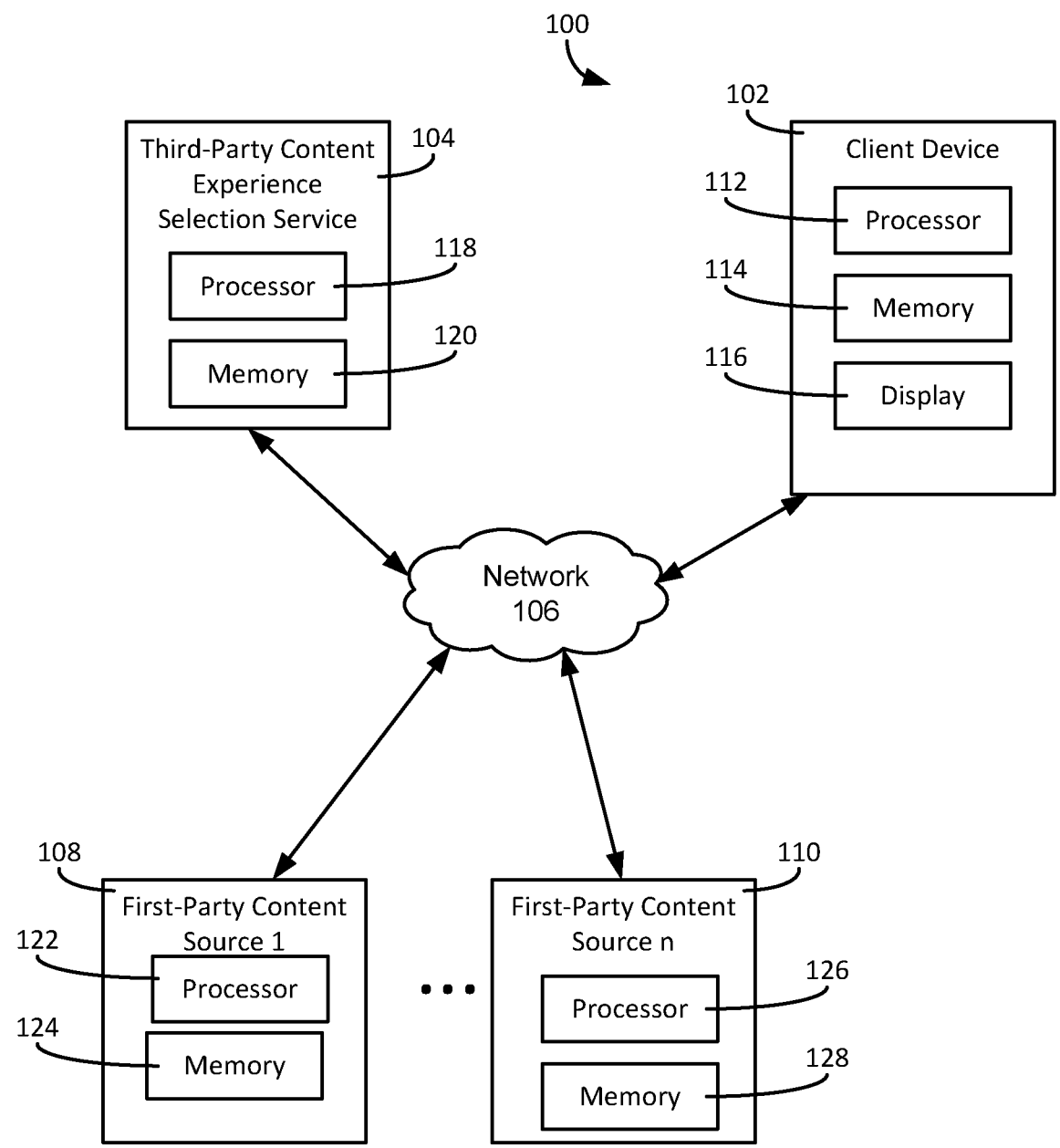
FIG. 1 is a block diagram of a computer system, in an accordance with a described implementation.

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

A first-party content provider may allow a third-party content experience selection service to dynamically determine third-party content experience to be provided in conjunction with first-party content provider's content. The third-party content experience determined by the third-party content experience selection service may include a series of third-party content elements. The third-party content elements include advertisements. A frame (e.g. a sequential multi-frame) may be utilized on a first-party content provider's webpage to display to the user the third-party content experience. In some implementations, the frame may display to the user one third-party content element at a time. The third-party content providers (e.g., advertisers) may bid on those slots.

Each third-party content element may include an image, a text blurb, and navigational controls that allow for viewing of third-party content elements in quick succession. The content provided by the third-party content experience selection service may be well suited for serving content on mobile devices as well as other computing devices. Users of mobile devices are typically consuming bite sized content in a disengaged way. Serving third-party content to such users in a frame or banner as discussed herein may advantageously engage the users with the third-party content.

The third-party content experience selection service may maintain third-party content elements entered by third-party content providers, and serve series of third-party content elements to the users' computing devices. A third-party content provider may enter several third-party content elements and indicate that the third-party content provider wishes for a particular group of third-party content elements to be served together as part of a single third-party content experience. For example, the third-party content provider may have several new products that they wish to promote using the third-party content selection service. In this implementation, the third-party content provider may create a third-party content element for each product and indicate that these third-party content elements need to be served together. As a result, the third-party content selection service may serve this group of third-party content elements to a user as part of a single third-party content experience. In some implementations, this third-party content experience may include additional third-party elements that are provided by this third-party content provider or by one or more other third-party content providers.

Based on user interest information and/or contextual information associated with the first-party content provider's webpage, the third-party content experience selection service may determine an appropriate third-party content experience, consisting of a series third-party content elements, that would be of interest to the user. The third-party content experience selection service may then return to the web browser a first third-party content element from the series of third-party content elements. After the user views this third-party content element and indicates that they would like to view the next third-party content element (e.g., by using the navigational control in the first third-party content element), the third-party content experience selection service may receive a request for the next third-party content element. While processing this request, the third-party content selection service may dynamically update various aspects associated with the third-party content experience being served to the user including, but not limited to, the order of the remaining content elements, the length of the third-party content experience, and/or the user interface of the remaining third-party content elements.

Once the third-party content experience is dynamically updated, the next third-party content element from the updated third-party content experience is served to the user. During the user's interaction with the third-party content experience, the third-party content experience selection service may determine that the user may be interested in another third-party content experience (e.g., on a another topic), and provide the user with an option to start viewing another content experience.

Upon viewing all the third-party content elements in the third-party content experience, the user may be provided with an offer or another reward. The user may have an option to share viewing the third-party content experience on at least one social network. The fees that the third-party content providers owe for their third-party content elements being served to the user may depend on how many third-party content elements the user viewed, and/or time of engagement with the third-party content elements. For example, if the user clicked through an entire carousel of travel related advertisements, the third-party content provider may be billed more than if the user only clicked through few of the third-party content elements. Thus, the third-party content provider may be billed based on the user engagement with the third-party content experience. In some implementations, a cost per mille ("CPM") model may be utilized to determine the fees owed by the third-party content providers.

Some first-party content providers may display a top ten lists, such as a top ten list of top ten celebrities. Instead of having a long webpage with the information about the top ten items (e.g., picture and text underneath the picture for each celebrity), the first-content provider may break this content into ten webpages and have third-party content experiences displayed around the first-party content. In this implementation, each of these ten webpage may have at least one frame displaying third-party content experiences, and third-party content providers (e.g., advertisers) may bid on those slots.

Referring to FIG. 1, a block diagram of a computer system 100 in accordance with a described implementation is shown. The system 100 includes a client device 102, which communicates with other computing devices via a network 106. The client device 102 may execute a web browser or other application (e.g., a video game, a messenger program, a media player, a social networking application, a navigation program, etc.) to retrieve content from other devices over a network 106. For example, the client device 102 may communicate with any number of first-party content sources 108, 110 (e.g., a first content source through nth content source). The first-party content sources 108, 110 may provide webpage data and/or other content, such as images, video, audio, or an application to the client device 102. In some implementations, the first-party content sources 108, 110 may provide a first-party webpage to the client device 102 that includes additional third-party content selected by a third-party content experience selection service and/or another service.

The computer system 100 may include a third-party content experience selection service 104 configured to maintain third-party content elements provided by third-party content providers and process requests for third-party content experiences. Upon receiving a request for a third-party content experience for a particular user, the third-party content experience selection service 104 may determine an appropriate third-party content experience consisting of multiple content elements to be served to the client device 102 utilized by the user. The third-party content experience selection service 104 may utilize user interest information and/or contextual webpage information to determine the appropriate third-party content experience.

The third-party content experience selection service may manage third-party content elements across one or multiple third-party content networks. Although a single third-party content experience selection service 104 is shown in FIG. 1, multiple services systems may be connected to the network 106, each configured to manage, select, and deliver third-party content to the client devices 102.

The network 106 may be any form of computer network that relays information between the client device 102, the content sources 108, 110, and the third-party content experience selection service 104. For example, the network 106 may include the Internet and/or other types of data networks, such as a local area network (LAN), a wide area network (WAN), a cellular network, satellite network, or other types of data networks. The network 106 may also include any number of computing devices (e.g., computer, servers, routers, network switches, etc.) that are configured to receive and/or transmit data within the network 106. The network 106 may further include any number of hardwired and/or wireless connections. For example, the client device 102 may communicate wirelessly (e.g., via WiFi, cellular, radio, etc.) with a transceiver that is hardwired (e.g., via a fiber optic cable, a CAT5 cable, etc.) to other computing devices in the network 106.

The client device 102 may be any number of different types of user electronic devices configured to communicate via the network 106 (e.g., a laptop computer, a desktop computer, a tablet computer, a smartphone, a digital video recorder, a set-top box for a television, a video game console, combinations thereof, etc.). The client device 102 is shown to include a processor 112 and a memory 114, i.e., a processing circuit. The memory 114 may store machine instructions that, when executed by the processor 112 cause the processor 112 to perform one or more of the operations described herein. The processor 112 may include a microprocessor, ASIC, FPGA, etc., or combinations thereof. The memory 114 may include, but is not limited to, electronic, optical, magnetic, or any other storage or transmission device capable of providing the processor 112 with program instructions. The memory 114 may include a floppy disk, CD-ROM, DVD, magnetic disk, memory chip, ROM, RAM, EEPROM, EPROM, flash memory, optical media, or any other suitable memory from which the processor 112 can read instructions. The instructions may include code from any suitable computer programming language such as, but not limited to, C, C++, C#, Java, JavaScript, Perl, HTML, XML, Python and Visual Basic.

The client device 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of the client device 102 (e.g., a monitor connected to client device 102, a speaker connected to client device 102, etc.), according to various implementations. For example, the client device 102 may include an electronic display 116, which displays webpages and other data received from the content sources 108, 110 and/or the third-party content experience selection service 104. In various implementations, the display 116 may be located inside or outside of the same housing as that of the processor 112 and/or the memory 114. For example, the display 116 may be an external display, such as a computer monitor, television set, or any other stand-alone form of electronic display. In other implementations, the display 116 may be integrated into the housing of a laptop computer, a mobile device, or other form of a computing device having an integrated display.

The first-party content sources 108, 110 may be one or more electronic devices connected to the network 106 that provide content to devices connected to the network 106. For example, the content sources 108, 110 may be computer servers (e.g., FTP servers, file sharing servers, web servers, etc.) or combinations of servers (e.g., data centers, cloud computing platforms, etc.). The content may include, but is not limited to, webpage data, a text file, a spreadsheet, images, search results, and other forms of electronic documents. Similar to the client device 102, the content sources 108, 110 may include processing circuits comprising processors 122, 126 and memories 124, 128, respectively, that store program instructions executable by the processors 122, 126. For example, the processing circuit of the content source 108 may include instructions such as web server software, FTP serving software, and other types of software that cause the content source 108 to provide content via the network 106.

Similar to the content sources 108, 110, the third-party content experience selection service 104 may be one or more electronic devices connected to the network 106. The third-party content experience selection service 104 may be a computer server (e.g., FTP servers, file sharing servers, web servers, etc.) or a combination of servers (e.g., a data center, a cloud computing platform, etc.). The third-party content experience selection service 104 may have a processing circuit including a processor 118 and a memory 120 that stores program instructions executable by the processor 118. In cases in which the third-party content experience selection service 104 is a combination of computing devices, the processor 118 may represent the collective processors of the devices and the memory 120 may represent the collective memories of the devices. The client device 102 may identify itself to the third-party content experience selection service 104 through the use of one or more device identifiers. Device identifiers may include, but are not limited to, cookies, UDIDs, device serial numbers, telephone numbers, or network addresses.

According to various implementations, the content sources 108, 110 may provide webpage data to the client device 102 that includes one or more content tags. In general, a content tag may be any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., content sources 108, 110, third-party content experience selection service 104, etc.), a network location (e.g., a URL) associated with clicking on the third-party content, how the third-party content is to be rendered on a display, a command that causes client device 102 to set a browser cookie (e.g., via a pixel tag that sets a cookie via an image request), one or more keywords used to retrieve the third-party content, and other functions associated with providing third-party content with a first-party webpage. In other words, a content tag may cause the client device 102 to send a content selection request to the third-party content experience selection service 104 or another system that delivers third-party content. In some implementations, the content source 108 may provide webpage data that causes client device 102 to retrieve third-party content from the third-party content experience selection service 104. In another implementation, the content may be selected by the third-party content experience selection service 104 and provided by the content source 108 as part of the first-party webpage data sent to the client device 102. In a further implementation, the third-party content experience selection service 104 may cause the client device 102 to retrieve third-party content from a specified location, such as the memory 114 or the content sources 108-110.

The content sources 108, 110 may also provide an executable application to the client device 102. Exemplary applications may include, but are not limited to, messaging programs (e.g., chat programs, email programs, text messaging programs, etc.), navigation programs, games, scheduling programs (e.g., programs that allow a user maintain a list of appointments, etc.), social networking applications, and content-streaming programs (e.g., audio streaming applications, video streaming applications, etc.). In other implementations, an application installed on the client device 102 may be pre-installed (e.g., by the manufacturer or retailer) and configured to receive content from the content sources 108, 110. For example, a pre-installed media player application may be configured to download or stream a song from content source 108. An application executed by the client device 102 may be configured to provide a device identifier for the application to the third-party content experience selection service 104. For example, the application may be configured to generate and/or provide a UDID or other device identifier to the third-party content experience selection service 104. Such a device identifier may be provided by the client device 102 to the third-party content experience selection service 104 as part of a content selection request. For example, a game on the client device 102 may request advertisements from the third-party content experience selection service 104 to be presented within the game.

The users may be provided with an opportunity to control whether programs or features may collect and/or share personal information (e.g., UDID). In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by third-party content experience selection service or another service.

The third-party content selected by the third-party content experience selection service 104 may be provided by the third-party content experience selection service 104 to the client device 102 via the network 106. For example, one or more third-party content providers may enter third-party content information using one or more user interfaces associated with the experience selection service 104. The third-party content experience selection service 104 may then provide selected combinations of the third-party content to the client device 102 to be presented in conjunction with a first-party webpage provided by the content source 108. In other implementations, the third-party content experience selection service 104 may provide an instruction to the client device 102 that causes the client device 102 to retrieve the selected third-party content (e.g., from the memory 114 of the client device 102, from the content source 110, etc.).

Figure 2:
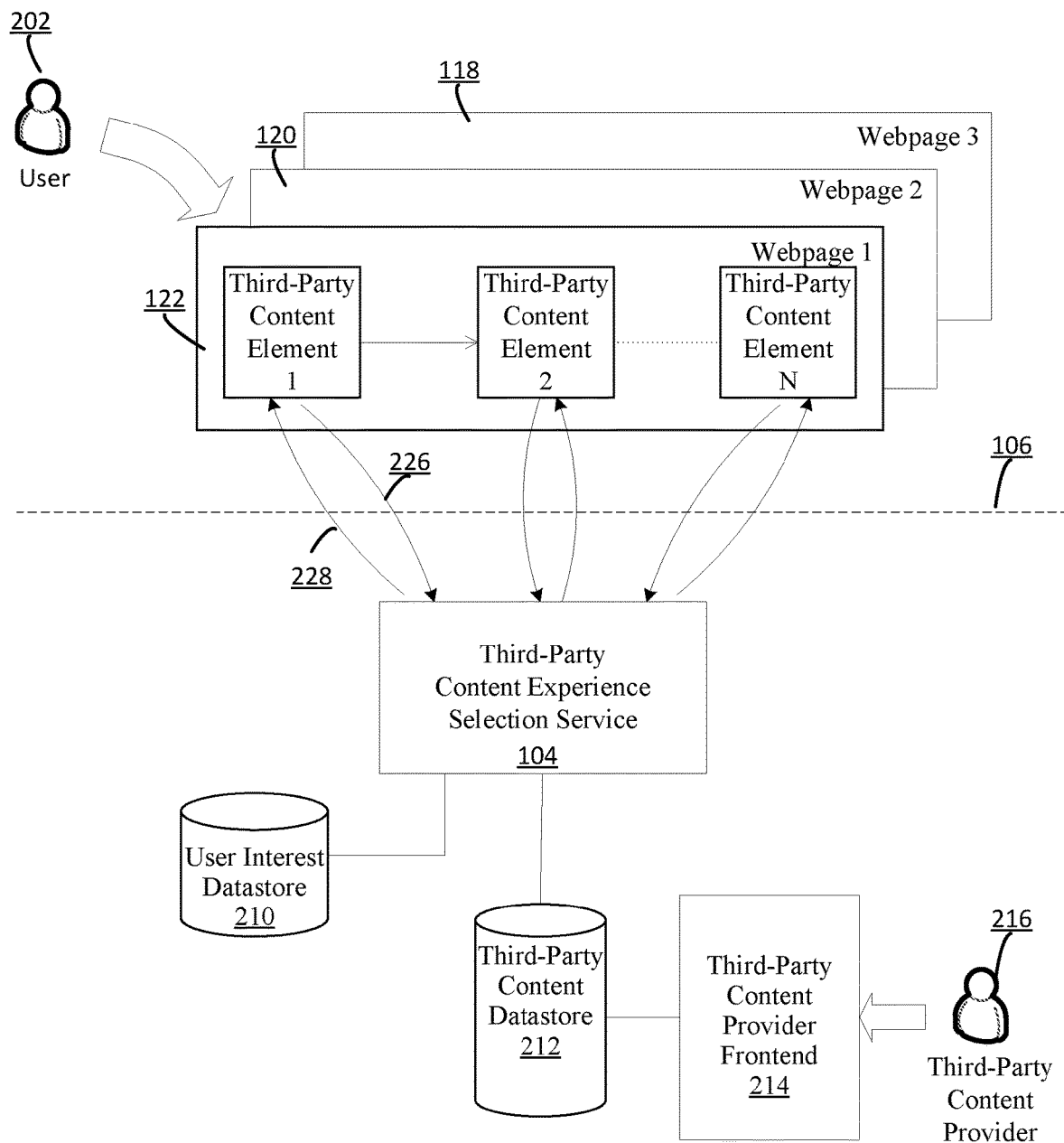
FIG. 2 is a block diagram of a third-party content experience selection service storing third-party content, and delivering third-party content experiences to webpages visited by a user, in an accordance with a described implementation.

FIG. 2 is a block diagram illustrating the third-party content experience selection service 104 delivering third-party content to webpages 118, 120, and 122. As shown, a third-party content provider may enter data for third-party content using a third-party content provider frontend 214. The data entered by the third-party content provider may be stored in a third-party content datastore 212. In some implementations the third-party content datastore 212 may be part of the third-party content experience selection service 104 or may be accessible by the third-party content experience selection service 104. The third-party content experience selection service 104 may include or have access to a user interest datastore 210, which may store data related to users who have previously viewed third-party content served by the third-party content experience selection service 104.

The user interest data may include various data regarding users including any combination of, but not limited to, demographics data, geographic data, etc. User interest data may be composed of distillations of the user's actual interests. For example, a known auto enthusiast would be tagged as such. Interests may be derived from user interaction with the content service or from other data repositories. This data may be joined with user geographic location, demographic, sex, and other type of data. Users may be identified by a user unique identifier (e.g., login or a unique hash) that may be present in an accessible cookie in their browser.

A user 202 may open a web page 122 in a web page browser. If the user in the third-party content network (e.g., an advertisement network associated with the third-party content experience selection service 104, the user web browser may request (e.g., 226) third-party content from the third-party content experience selection service 104. The request may be transmitted over the network 106 (shown as a broken line in FIG. 2). The request for the third-party content may include data associated with the user, and/or contextual information about the first-party content that is served on the webpage 122. Based on the received request, the third-party content experience selection service 104 may determine a content experience consisting of multiple content elements using the third-party content datastore 212 and the user interest datastore 210. The first content element in the determined content experience may be transmitted (e.g., 228) back to the web browser for display on the webpage 122. A single content element may be shown to the user at a time. Upon viewing the first content element, the user may indicate that they would like to see the next content element in the third-party content experience. In some implementations, a user of a mobile computing device may swipe the screen or tap on a navigational control to view the next third-party content element in the third-party content experience.

When the third-party content experience selection service 104 receives a request for the next content element in the content experience, the third-party content experience selection service 104 may dynamically update one or more aspects of the remaining third-party content elements in the third-party content experience including, but not limited to, the order of the remaining content elements, the length of the third-party content experience, and the user interface of one or more of the remaining third-party content elements. After the third-party content experience selection service 104 dynamically updates the various aspects of the third-party content experience, the next third-party content element in the third-party content experience is identified and transmitted back to the webpage 122. The transmitted third-party content elements may be dynamically formatted to maximize user engagement.

In some implementations, third-party content elements 1 through N are displayed to the user 202, one third-party content element at a time. For example, the first third-party content element is shown by itself in a banner or a frame and the user may navigate to the next third-party content element. A third-party content experience can include any number of third-party content elements (e.g., ten third-party content elements, twenty third-party content elements, etc.). Although three webpages 118, 120, and 122 are displayed in FIG. 2, the third-party content experience selection service 104 may serve content elements to any number of webpages. Each webpage may be associated with a first-party content provider (e.g., publisher). In some implementations, the first-party content providers, who want to allow for third-party content experiences to be displayed on their webpages, may create accounts and enter third-party content elements using the third-party content provider frontend 214.

Although a single third-party content provider 216 is shown in FIG. 2, any number of third-party content providers may enter and/or upload third-party content using the third-party content provider frontend 214. In some implementations, the third-party content provider may provide one or more sets of content elements that will appear together in a third-party content experience. For example, a third-party content provider may be launching new products and may enter a content element for each of the ten products. The third-party content provider may indicate that some or all of the entered third-party content elements should be shown together in one or more third-party content experiences. For example, a third-party content provider may enter fifteen third-party content elements. In this implementation, the third-party content provider may identify specific third-party content elements (e.g., ten third-party content elements) that need to be served together without any other third-party content elements from other third-party content providers, while the remaining third-party content elements (e.g., the remaining five third-party content elements) can be served individually with third-party content elements entered by other third-party content providers.

The third-party content provider frontend 214 may be implemented as a user interface shown to the third-party content provider on one or more webpages, or as a desktop or mobile application. For each third-party content element, the third-party content provider may enter third-party content data including any combination of, but not limited to, one or more images, one or more videos, one or more lines of text, and animation. The third-party content element may specify which third-party content elements entered by the third-party content provider should be served together. In some implementations, the third-party content provider may specify whether the third-party content elements may be served together with third-party content elements originating from other third-party content providers.

Figure 3:
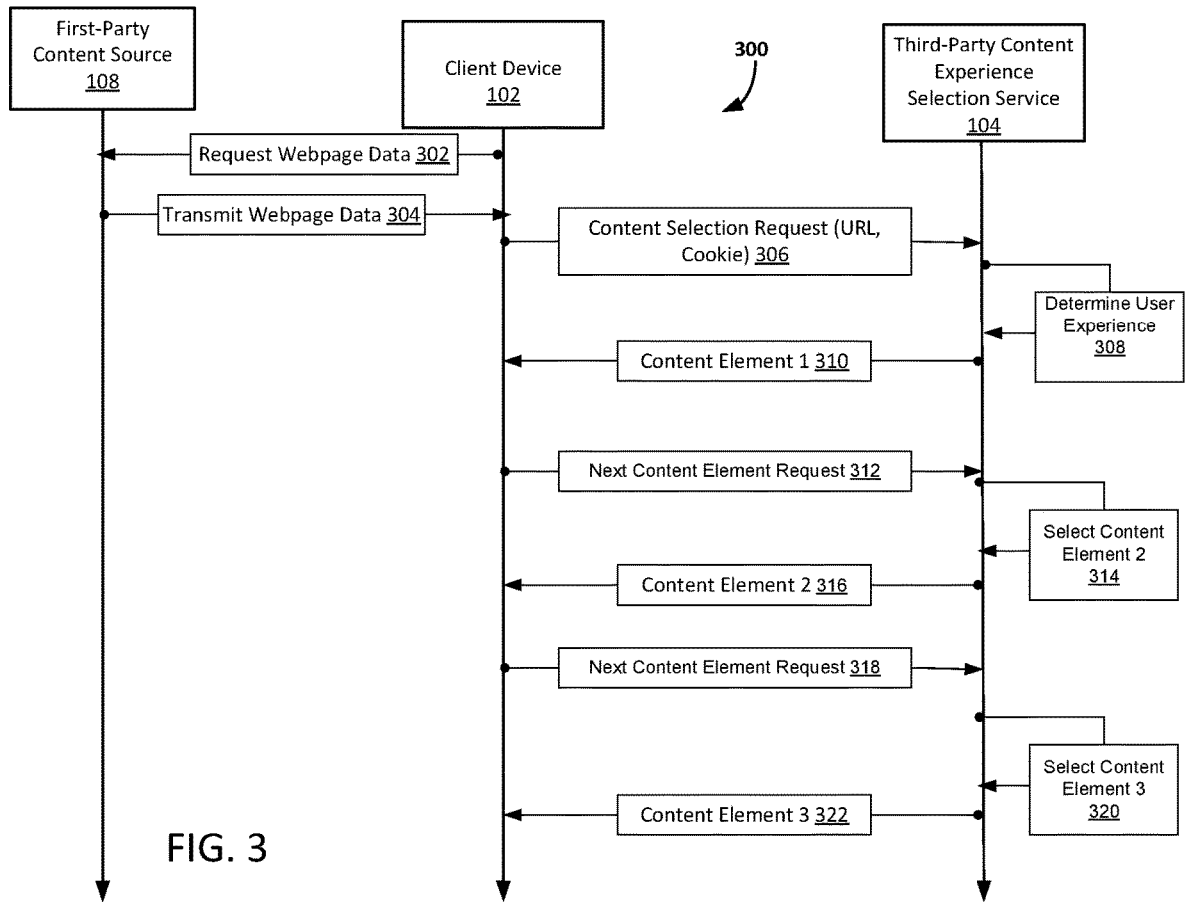
FIG. 3 is a flow diagram of communications between a first-party content source, a client device, and a third-party content experience selection service, in an accordance with a described implementation.

FIG. 3 illustrates a flow diagram displaying communications between the first-party content source 108, the client device 102, and the third-party content experience selection service 104. At step 302, the client device 102 requests webpage data from the first-party content source 108. In response, the first-party content source returns (304) the requested webpage data including various first-party content, and the client device 102 displays the webpage data to the user. The webpage data transmitted to the client device 102 may include information that would cause the client device 102 to request third-party content data from one or more third-party content services.

As shown in FIG. 3, the client device transmits (306) a content selection request to the third-party content experience selection service 104. The content selection request may include information including, but not limited to URL associated with the webpage that the user is viewing, and cookie information that may include information about the user. The cookie information may include data related to the user such as the user location information, user identification information, use demographics information, and/or type of content that the user was viewing on the webpage.

Based on the content selection request, the third-party content experience selection service 104 determines (308) a user experience to be served to the user. In some implementations, using the received cookie information, the third-party content selection service 104 determines if the user interest datastore 210 includes any information for the user. For example, the user may have already interacted with one or more of the third-party content experiences in the past, and those interactions may be used to determine what type of third-party content experience the user may be interested in viewing. The user may have visited websites related to celebrities, and/or previously viewed third-party content experiences related to celebrities. The webpage currently viewed by the user may be related to travel. In this implementation, even though the webpage contextual information is related to travel, the third-party content selection service 104 may determine a set of third-party content elements at least some of which may relate to celebrities because the user has previously shown interest in celebrities.

When user information is not available (e.g., the user is a new user or the user opted out of their content experience interactions being recorded), contextual information may be relied upon to determine the third-party content experience for serving to the user. Contextual information may include one or more topics related to first-party content shown on the webpage. For example, the webpage may be a health and fitness blog. In this implementation, the contextual information may indicate that the first-content data shown on the webpage relates to health and fitness. In this implementation, the third-party content selection service 104 may identify third-party content elements that relate to health and fitness.

Once the third-party content selection service 104 identifies the third-party content elements, a first content element is transmitted (310) to the client device 102. The first content element transmitted to the client device 102 may be the first content element in the determined series of third-party content elements. Once the first third-party content element is shown to the user in a banner or another type of frame, the user may choose to interact with this third-party content element. The visualization of the third-party content element may include navigational controls and information about the total number of third-party content elements in this third-party content experience. The user may click (one a personal computer) or tap with the finger or pointing device (on a touch screen device) on the shown third-party content element, which may cause opening of a separate webpage that is associated with that third-party content element. The user may request to view the next or previous third-party content element (e.g., by clicking on a navigational control provided in the visualization of the third-party content element).

Upon the user indicating that they wish to view the next third-party content element, the client device 102 transmits a request (312) to the third-party content selection service 104 for the next third-party content element. Upon receiving the request for the next third-party content element in the user experience, the third-party content experience selection service 104 may first dynamically determine updates (if any) to the remaining content elements that have not been displayed yet to this user based on the information received with the request for the next content. In some implementations, various attributes associated with the user experience may be updated including, but not limited to, the order of the remaining content elements, the user interface of the next content element, and the length of the third-party content user experience. After the third-party content experience is updated (if necessary), the third-party content experience selection service 104 may identify the next third-party content element from the third-party content experience, and transmit information related to the next third-party content element back to the client device 102.

The user may continue interacting with the third-party content experience by requesting to view the next third-party content element (e.g., request in block 318 and third-party content element returned in block 322). The user may also be able to view previously viewed third-party content elements. One or more of the user interactions with the third-party content experience may be recorded by the third-party content selection service (e.g., in the user interests data store 212 or another storage). For example, user interactions information may include whether the user clicked on any of the third-party content elements, how many third-party content elements the user viewed in the third-party content experience viewed by the user. This information would be helpful in serving third-party content experience that may be of interest to the user. The recorded user information may include information that identifies the user or the computing device utilized by the user. The users may choose to opt out of their interactions being recorded.

Figure 4A:
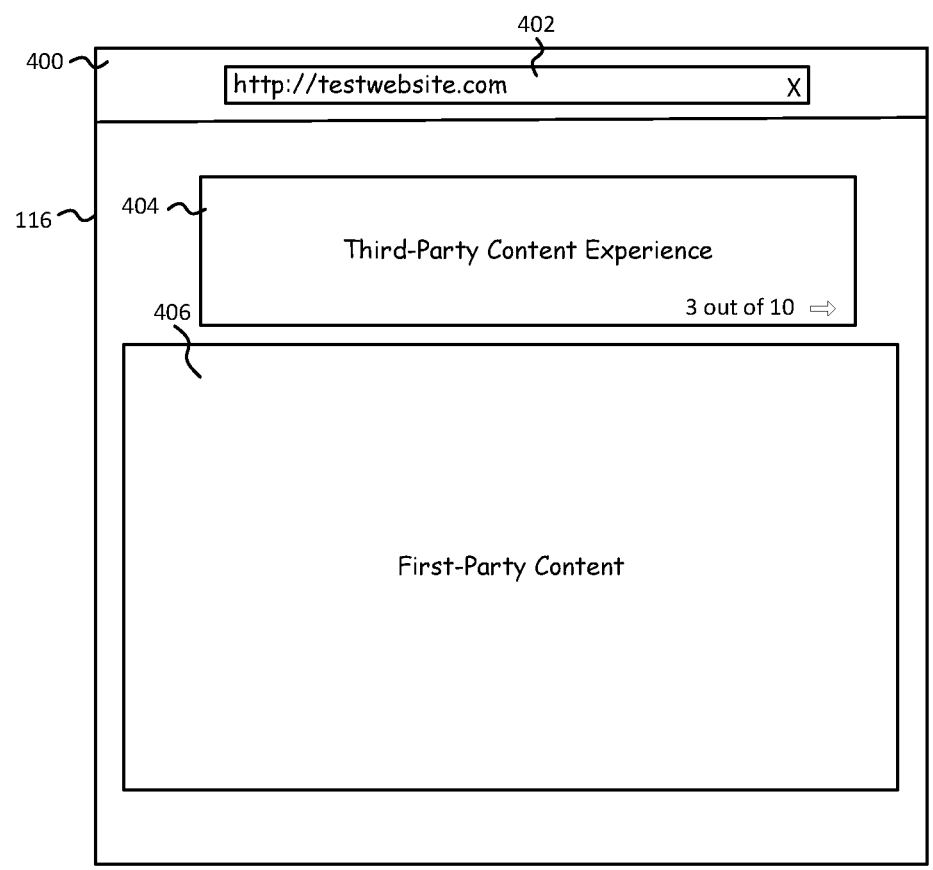
FIG. 4A is an illustration of a webpage containing first-party content and a frame displaying a third-party content element, in an accordance with a described implementation.

FIG. 4A illustrates an exemplary webpage 400 including a frame 404 that displays a third-party content experience consisting of series of third-party content elements. The first-party content provider may specify the size and the number of frames including the third-party content experiences that can be shown on the first-party content provider webpages. For example, the first-party content provider may choose not to allow any third-party content on a main webpage associated with their website. In this implementation, the first-party content provider may allow for one or more frames that would display third-party content experience and/or other third-party content on at least some of their webpages.

The frame 404 displaying the third-party content experience is shown in the top portion of the webpage 400. The frames containing the third-party content experiences can be shown in any part of the webpage (e.g., top of the webpage, side of the webpage, the bottom of the webpage, etc.). More than one frame containing third-party content may be displayed on a single webpage. For example, three frames, each displaying a third-party content experience, may be shown on a single webpage with one frame displayed on the top of the webpage, second frame displayed on the bottom of the webpage, and third frame displayed on the right side of the webpage.

When a user is viewing the webpage 400 on a mobile computing device (e.g., smart phone), they may swipe the screen to view third-party content elements of the third-party content experience. On some computing devices (e.g., desktop computer), the user may click on the third-party content elements of the frame displaying one of the content elements of the third-party content experience in order to view the next third-party content element.

Figure 4B:
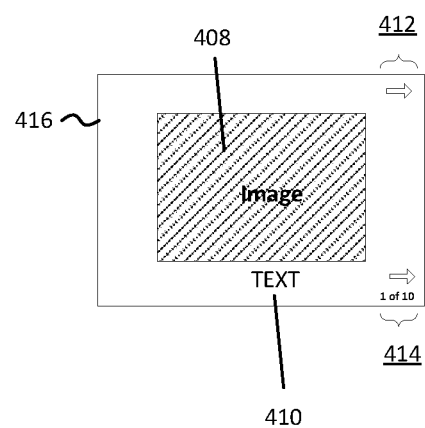
FIG. 4B is an illustration of a third-party content element, in an accordance with a described implementation.

Now referring to FIG. 4B, a third-party content element 416 is illustrated. The third-party content element 416 may be displayed to the user in the frame 404. The third-party content element 416 is shown to include an image 408, text 410, and navigational arrows 412 and 414. In the bottom right corner, the total number of third-party content elements is shown to be 10 and the third-party content element 416 is the first third-party content element shown to the user form the series of ten third-party content elements that make up the third-party content experience. The first-party content provider may specify whether the third-party content served on their webpages should display images, video, etc. Although the image is shown above text portion, the image and the text can be shown in any location of the third-party content element. The third-party content element 416 may include any other type of visual information such as a video, animation, etc.

Figure 5:
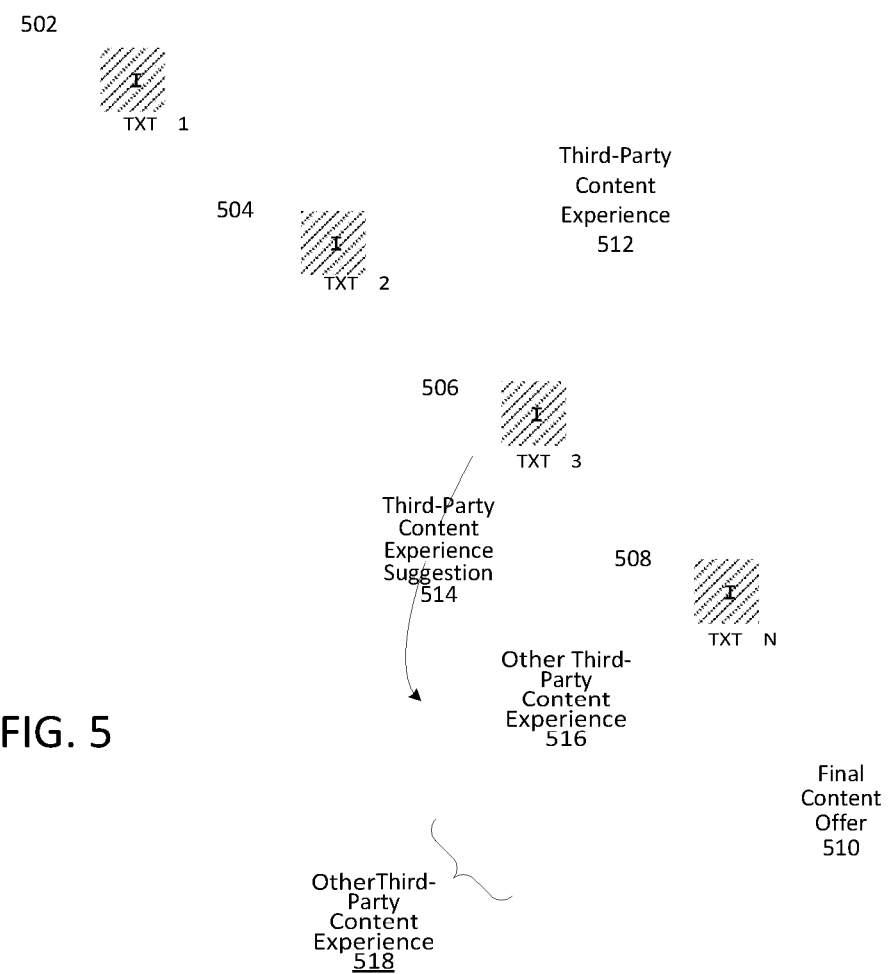
FIG. 5 is an illustration of a third-party content experience including other content experience suggestions provided by a third-party content experience selection service, in an accordance with a described implementation.

FIG. 5 illustrates a third-party content experience 512 including third-party content elements 502, 504, 506, and 508. As shown, each content elements includes an image and a text blurb. Any other combination of information may be included in each third-party content element including, but not limited to, text, one or more images, videos, animation, and hyperlinks. Each content element may provide the user with information about the third-party content experience including the total number of third-party content elements in the third-party content experience, and/or the number that the third-party content element is in the list of the third-party content elements. For example, the content element 502 may display that it is the first out of four total content elements (e.g., "1 of 4"). The third-party content elements may include navigational controls that allow the user to navigate through the third-party content elements in the third-party content experience. In some implementations, each third-party content element may include navigational arrows (e.g., one arrow pointing to the left, and second arrow pointing to the right). In these implementations, when the user clicks or taps on the arrow, the user is shown next or previous content element in the content experience. At least some of the third-party content elements may direct response content that asks the user to provider information in order to get a coupon or discount for a product or service (e.g., ask the user to enter their zip code in order to get 10% coupon for the product shown/explained in the third-party content element).

For example, the third-party content experience 512 may display to the user content elements related to travel. In this implementation, each third-party content element in the third-party content experience 512 may display advertisements or other type of third-party content related to travel. The content element 502 may show third-party content related to airfare and include an image displaying an airplane in the sky and a text blurb specifying airfare pricing information. When the user clicks on a navigational control to proceed to the next content element, the third-party content element 504 may be shown to the user in the frame. The third-party content element 504 may display hotel related information. The third-party content elements 502, 504, 506, and 508 may be provided by the same third-party content provider or by multiple third-party content providers.

In some implementations, the third-party content elements may allow the user to enter information including whether the user wishes to proceed with the third-party content experience or switch to another content experience. As shown in FIG. 5, a third-party content experience suggestion 415 may be provided to the user. In some implementations, the user may be prompted with a pop up message that asks whether the user is interested in switching to a third-party content experience related to another subject matter. In the previous example, the third-party content experience 512 related to travel. In that implementation, another third-party content experience may be suggested to the user that is related to another subject. In some implementations, predicted user drop off rate and/or the goals of the third-party content providers whose third-party content is part of the third-party content experience may be used in determining whether to make a suggestion to the user to switch to another third-party content experience. The user drop off rate may be determined by the service 104 using data regarding previous user interactions with third-party content experiences and the user interactions with the current third-party content experience.

Users may be directed to new content experiences in a way that maximizes system revenue. If one particular content experience is particularly valuable and relevant to the user, the third-party content experience selection service 104 may reduce how often it shows new suggestions. Once a user is viewing a content experience, the third-party content experience selection service 104 may choose to immediately offer new content experiences that are deemed more valuable, more interesting to the user, and more likely to generate maximum revenue. For example, if an automotive enthusiast was looking at a sponsored slide show from one third-party content provider about a new car model built by the third-party party-content provider, the third-party content experience selection service 104 may not show any new suggestions until very late in the sequence. If the same user is looking at a series of third-party content elements (e.g., a slide show) about celebrities, the third-party content experience selection service 104 may immediately suggest the sponsored content experience (i.e., a slide show of third-party content elements) about the new car model by the third-party party-content provider.

If the user indicates that they wish to switch to another third-party content experience, then the first content element in other third-party content experience 516 may be shown to the user. As further shown in FIG. 5, the user can switch to third-party content experience 518 upon viewing a second content element in the third-party content experience 516. In some implementations, the user may indicate that they wish to switch to another third-party content experience without being first prompted to do so.

Figure 6:
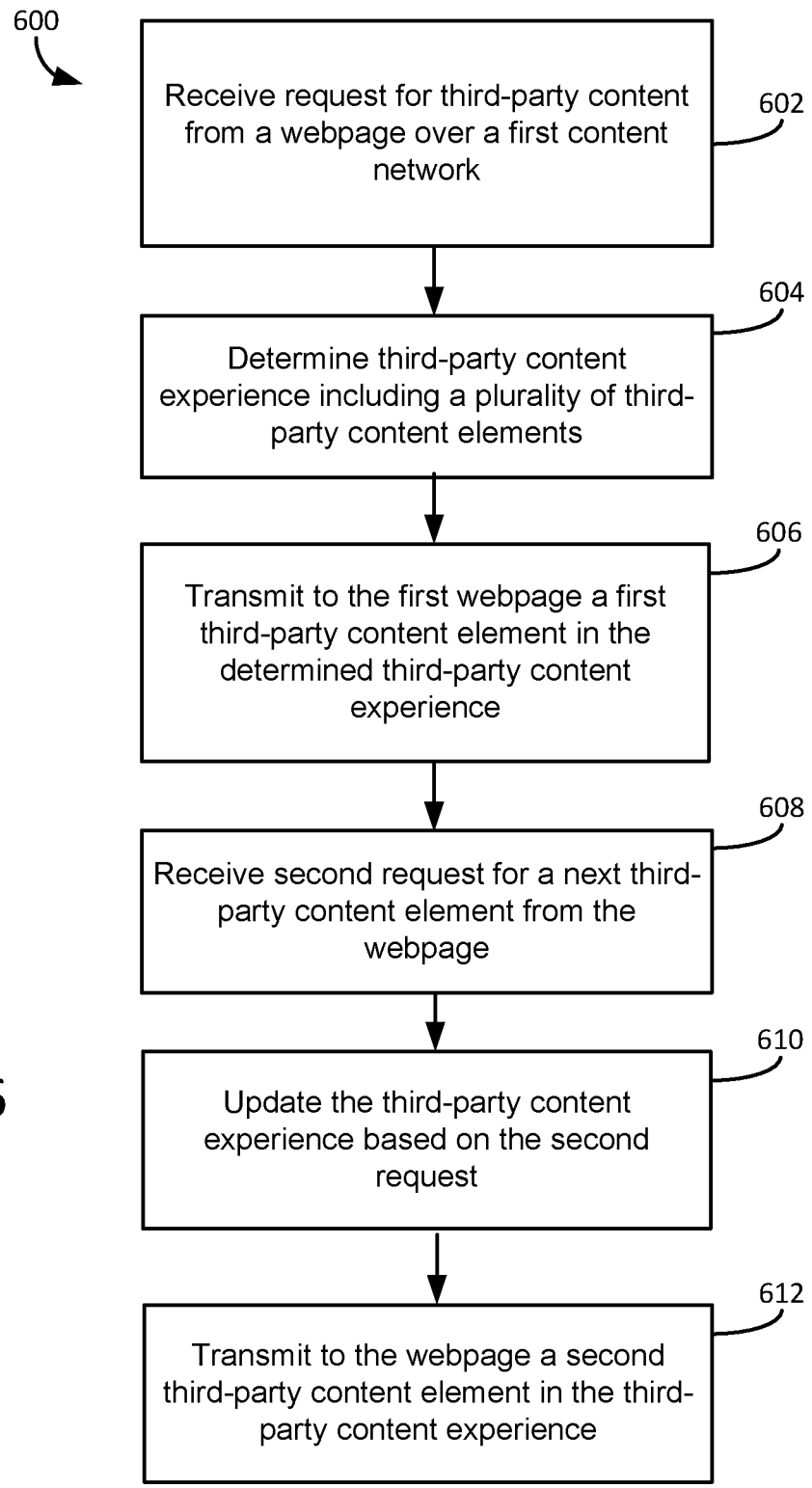
FIG. 6 is a flow diagram of a process for determining third-party content elements, in an accordance with a described implementation.

FIG. 6 is a flow diagram of a process 600 for servicing dynamically determined third-party content elements, in accordance with an illustrative implementation. The process 600 can be implemented on a computing device (e.g., the direct third-party content experience selection service 104). In one embodiment, the process 600 is encoded on a computer-readable medium that contains instructions that, when executed by the computing device, cause the computing device to perform operations of the process 600.

FIG. 6 includes receiving (block 602) a request for third-party content from a webpage over a first content network. The webpage may include a frame that is configured to display one third-party content element at a time. Upon loading the webpage, the web browser on the user's computing device may transmit the request which may include the URL associated with the webpage and/or user information. The user information may be included in a cookie that is transmitted in the request. The cookie information may include any combination of the following user identification information, user computing device identification information, user demographics, user location, user interests, etc. In some implementations, the request may include an identifier or a description that identifies the subject matter (e.g., travel content) that the webpage displays to the user.

At block 604, a third-party content experience is determined based on the request received from the webpage. The request may include URL information associated with the requesting webpage, cookie information, contextual information associated with the first party webpage, or any combination thereof. The determined third-party content experience may include a plurality of third-party content elements. In some implementations, if cookie information is included in the request, that cookie information is analyzed to determine the optimal series of third-party content elements. For example, the cookie information may include user identifying information that may assist the service 104 in identifying the user. If the user is identified by the service 104, the user's history of viewing and interacting with other third-party content experiences may be analyzed to determine the best series of third-party content elements. The cookie information used by the service 104 may include, user interests, demographics, location, etc. If the user information is unavailable, any combination of user demographics information, user location information, contextual information of the first-party content shown on the webpage may be used to determine the series of content elements to be served to the user. In some implementations, a combination of user information and contextual information may be utilized to determine a series of third-party content elements.

The users may be provided with an opportunity to control whether programs or features may collect and/or share personal information (e.g., demogrphics). In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by third-party content experience selection service or another service.

Upon determining the third-party content experience containing a plurality of third-party content elements, the order of the content elements in the third-party content experience is determined. In some implementations, the order of the third-party content elements may be based on the third-party content provider's goals. In these implementations, the third-party content provider may indicate that they want a higher click-through rate, higher number of impressions, or higher number of conversions. For example, the third-party content provider wants a higher click-through rate, and the third-party content elements making up a third-party content experience may be re-ordered based on this criteria and the historical performance information of the third-party content elements. The process 600 includes transmitting (block 606) to the first webpage a first third-party content element in the determined third-party content experience. In turn, the webpage may display the first third-party content element in a frame. The frame may be shown as a rectangular banner in any location of the webpage (e.g., in top section of the webpage).

The user may click on the first third-party content element, which would take the user to the landing page associated with the first third-party content element. For example, the landing page may be a webpage associated with an advertiser who entered the third-party content element into the third-party content experience selection service 104. The third-party content experience selection service 104 may record whether the user clicking on the first third-party content element resulted in a conversion for the third-party content provider associated with the first third-party content element. The third-party content provider may be billed for the conversion depending on the cost that is set up by the third-party content provider. If the user is not interested in viewing more information about the first third-party content element, they may click on a navigational indicator (or swipe the screen of a touch screen computing device), which may be configured to trigger the web browser to send another request to the third-party content experience selection service 104 for the next third-party content element.

At block 608, a second request for the next third-party content element from the webpage is received. The second request may include any of the following information user interaction information with the previous content element, user identification information, cookie information, etc. In some implementations, the second request may include at least some of the information that was included in the first request. In one implementation, the information passed with the second request and the subsequent request is not different from the information passed to the system from the web browser with the first request. As long as the user continues to present a unique token or cookie for each page view, the backend can do all the calculations. In some instances, a unique session key may be passed in each call to the system, so that if a user cannot be identified from an existing cookie identifier, there will at least be session level data available.

In other implementations, the second request may include information associated with the third-party content experience (e.g., identification information of the third-party content experience). The second request may include user interaction information describing the user interactions with the previous third-party content element(s). In some implementations, the user interaction information may be communicated by the web browser to the third-party content selection service 104 upon the user interactions in a separate transmission.

The third-party content experience may be updated (block 610) based on the second request. In some implementations, the order of the remaining third-party content elements in the third-party content experience may be changed based on the user interaction with the previously displayed content elements of the third-party content experience and/or other information associated with the user. For example, if the user has not clicked on any of the previously shown third-party content experience content elements, the user may be next shown a third-party content experience content element that has the highest historical click through rate of all the remaining third-party content elements in the third-party content experience. The length of the third-party content experience may be updated. In some implementations, third-party content experience content elements may be added to and/or removed from the third-party content experience. In some implementations, if the user is not engaging with any of the third-party content elements shown thus far, new third-party content elements may be added to the third-party content experience that the service 104 determined to have a higher chance of conversion.

After the third-party content experience is updated (if any updates are determined to be necessary), the next third-party content element in the third-party content experience is transmitted (block 612) to the webpage. Upon receiving the next content element, the webpage may replace the first third-party content element with the next third-party content element in the frame. The user may go back to the previous third-party content element by clicking on a navigational control in the present third-party content element that is configured to show the previous third-party content element to the user.

Upon reaching a final third-party content element in the content experience, the webpage may display to the user a final third-party content offer. The final content offer may include a coupon, gift, social sharing, links to additional third-party content experiences, or any combination thereof. Thus, the user is incentivized to share their viewing of the third-party content experience on their social networks, and/or view additional third-party content experiences.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be DELETEed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple such software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method comprising:
generating a first ordered list of content elements, and storing the first ordered list in a computer-readable storage medium;
transmitting, subsequent to the generating the first ordered list of content elements, a first content element of the first ordered list of content elements to a client device executing an application;
receiving, from the client device via the application, a request for content based on a user interaction with the first content element, the request including user interaction data with the first content element indicating a timing of user interactions with the first content element or whether the user interacted with the first content element;
dynamically updating data associated with the first ordered list of content elements subsequent to display of the first content element based at least in part on the user interaction data, the data being updated relating to at least one of: a content element to be added to the first ordered list of content elements, a content element to be removed from the first ordered list of content elements, and a length of the first ordered list of content elements; and
transmitting a second content element of the first ordered list of content elements to the client device based on the updated data.

2. The method of claim 1, wherein the application executed by the client device is a social networking application.

3. The method of claim 2, wherein the second content element includes a selectable object for sharing a viewing of the content experience on at least one social network, the method further comprising receiving, from the client device via the application, a selection of the object for sharing the viewing of the content experience on the at least one social network.

4. The method of claim 1, wherein each content element of the first ordered list of content elements includes audio or video.

5. The method of claim 1, further comprising determining a second ordered list of content elements based at least in part on a predicted user drop-off from interacting with the first ordered list of third-party user elements, and transmitting data associated with the second ordered list of content elements to the client device.

6. The method of claim 1, further comprising calculating a fee for a content provider associated with at least some of the content elements of the first ordered list of content elements based at least in part on the user interaction data.

7. The method of claim 1, wherein:
the third party content elements of the first ordered list of third party content elements are respectively associated with historical interaction parameter values; and
the dynamically updating data associated with the first ordered list of content elements comprises selecting, as the second content element, a content element of the first ordered list of content elements based on the historical interaction parameter values.

8. The method of claim 7, wherein:
the user interaction data with the first content element comprises an indication that the user did not interact with the first content element; and
the selecting, as the second content element, the content element of the first ordered list of content elements based on the historical interaction parameter values comprises selecting the content element having the highest or lowest historical interaction parameter value of the content elements of the first ordered list of content elements.

9. A computer-readable storage medium having machine instructions stored therein, the instructions being executable by a processor to cause the processor to perform operations comprising:
generating a first ordered list of content elements and storing the first ordered list in the computer-readable storage medium;
transmitting, subsequent to generating the first ordered list of content elements, a first content element of the ordered list to a client device executing an application;
receiving, from the client device via the application, a request for a next item in the first ordered list of content for subsequent display based on a user interaction with the first content element, the request including user interaction data with the first content element related to a timing of user interactions with the first content element or whether the user interacted with the first content element;
updating, subsequent to receiving the request for the next item in the first ordered list of content, data associated with the first ordered list based at least in part on the user interaction data, the data being updated relating to at least one of: an order for display of content elements of the first ordered list, a content element to be added to the first ordered list, a content element to be removed from the first ordered list, and a length of the first ordered list; and transmitting a second content element of the first ordered list to the client device based on the updated data.

10. The computer-readable storage medium of claim 9, wherein the application executed by the client device is a social networking application.

11. The computer-readable storage medium of claim 10, wherein the second content element includes a selectable object for sharing a viewing of the content experience on at least one social network, and the instructions, when executed by the processor, further cause the processor to receive, from the client device via the application, a selection of the object for sharing the viewing of the content experience on the at least one social network.

12. The computer-readable storage medium of claim 9, wherein each content element of the first ordered list of content elements includes an image and text.

13. The computer-readable storage medium of claim 9, wherein the instructions, when executed by the processor, further cause the processor to determine a second ordered list of content elements based at least in part on a predicted user drop-off from interacting with the first ordered list of third-party user elements, and to transmit data associated with the second ordered list of content elements to the client device.

14. The computer-readable storage medium of claim 9, wherein the instructions, when executed by the processor, further cause the processor to calculate a fee for a content provider associated with at least some of the content elements of the first ordered list of content elements based at least in part on the user interaction data.

15. A system comprising:
one or more data processors; and
one or more storage devices storing instructions that, when executed by the one or more data processors, cause the one or more data processors to perform operations comprising:
generating a first ordered list of content elements, and storing the first ordered list in a computer-readable storage medium;
transmitting, subsequent to generating the first ordered list of content elements, a first content element of the first ordered list of content elements to a client device executing an application;
receiving, from the client device via the application, a request for content based on a user interaction with the first content element, the request including user interaction data with the first content element indicating a timing of user interactions with the first content element or whether the user interacted with the first content element;
dynamically updating data associated with the first ordered list of content elements subsequent to display of the first content element based at least in part on the user interaction data, the data being updated relating to at least one of: a content element to be added to the first ordered list of content elements, a content element to be removed from the first ordered list of content elements, and a length of the first ordered list of content elements; and
transmitting a second content element of the first ordered list of content elements to the client device based on the updated data.

16. The system of claim 15, wherein the application executed by the client device is a social networking application.

17. The system of claim 16, wherein the second content element includes a selectable object for sharing a viewing of the content experience on at least one social network, and the instructions, when executed by the processor, further cause the processor to receive, from the client device via the application, a selection of the object for sharing the viewing of the content experience on the at least one social network.

18. The system of claim 17, wherein the instructions, when executed by the one or more data processors, further cause the one or more data processors to perform operations comprising determining a second ordered list of content elements based at least in part on a predicted user drop-off from interacting with the first ordered list of third-party user elements; and transmitting data associated with the second ordered list of content elements to the client device.

19. The system of claim 18, wherein the instructions, when executed by the one or more data processors, further cause the one or more data processors to perform operations comprising calculating a fee for a content provider associated with at least some of the content elements of the first ordered list of content elements based at least in part on user interaction data associated with the at least some content elements.

20. The system of claim 15, wherein each content element of the first ordered list of content elements includes video.

* * * * *